United States Patent [19]
Garner

[11] Patent Number: 6,043,889
[45] Date of Patent: Mar. 28, 2000

[54] MISALIGNMENT DETECTION APPARATUS AND METHOD

[76] Inventor: Dennis B. Garner, 22512 NE. 147th St., Brush Prairie, Wash. 98006

[21] Appl. No.: 09/115,922

[22] Filed: Jul. 15, 1998

[51] Int. Cl.[7] .................................................. G01B 11/26
[52] U.S. Cl. ........................ 356/373; 356/138; 356/153; 356/141.3; 33/287
[58] Field of Search .................... 356/372, 373, 356/375, 153, 138, 400, 141.3, 141.5, 139.03; 246/118, 119; 191/9; 33/286, 287, 645; 250/203.1; 238/339

[56] References Cited

U.S. PATENT DOCUMENTS

| | | | |
|---|---|---|---|
| 3,107,168 | 10/1963 | Hogan et al. | |
| 3,603,688 | 9/1971 | Vaniz | 356/153 |
| 3,864,039 | 2/1975 | Wilmarth | 356/372 |
| 4,181,430 | 1/1980 | Shirota et al. | 356/375 |
| 4,518,855 | 5/1985 | Malak | 356/141.3 |
| 4,747,454 | 5/1988 | Perryman | 356/153 |
| 5,186,421 | 2/1993 | Caccomo | 246/118 |
| 5,596,403 | 1/1997 | Schiff et al. | 356/139.03 |
| 5,684,578 | 11/1997 | Nower et al. | 356/141.3 |

Primary Examiner—Hoa Q. Pham
Attorney, Agent, or Firm—Litman, Kraai & Brown L.L.C.

[57] ABSTRACT

A rail misalignment detection system for use in verifying whether fixed span and moveable span rails on a fixed span and a moveable span of a rail bridge, extend within an acceptable range of misalignment when the moveable span is positioned in a closed alignment with respect to the fixed span of the bridge, comprises an optical beam transmitter and a receiver, one mounted on the fixed span and the other mounted on the moveable span, such that the transmitter directs a beam of collimated light to a photocell in the transmitter. The transmitter and receiver are mounted on the respective spans of the bridge such that their position relative to one another corresponds to the relative position or alignment of one set of the rails on the moveable span and fixed span of the bridge. The transmitter and receiver are further positioned relative to one another such that when the rails on the fixed and moveable spans extend within the acceptable range of misalignment the beam from the transmitter strikes the photocell to a sufficient degree to activate the photocell, and when the rails extend beyond the acceptable range of misalignment the beam does not strike the photocell to a sufficient degree to activate the photocell.

16 Claims, 5 Drawing Sheets

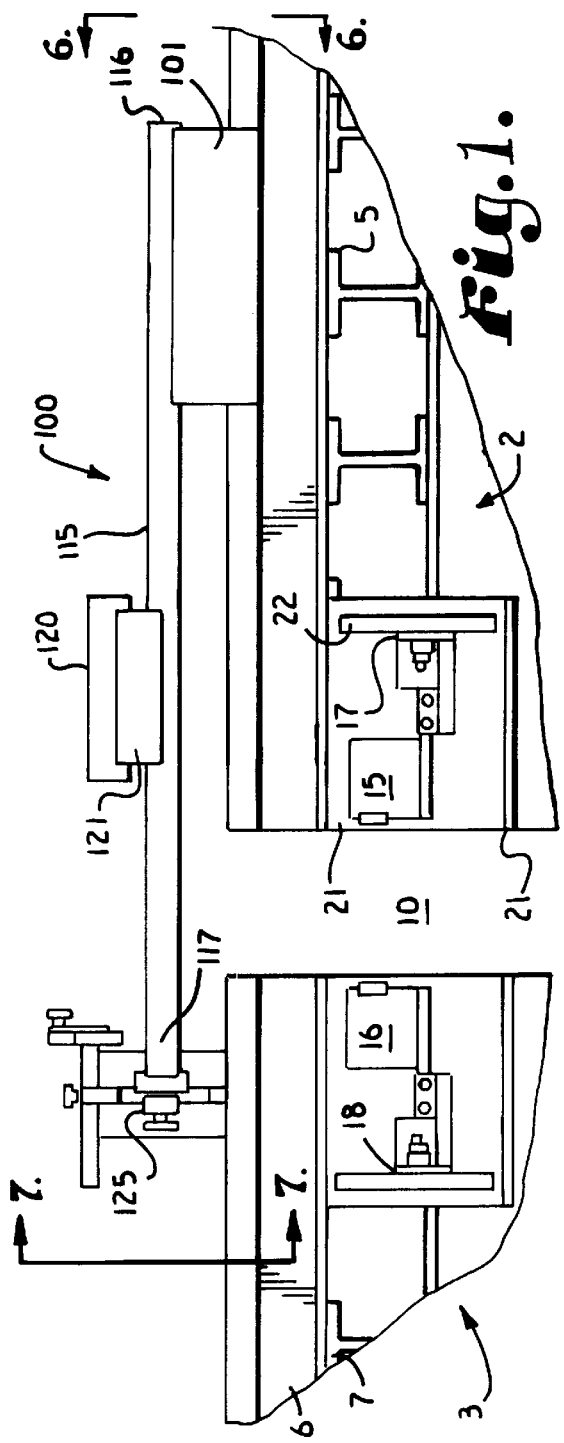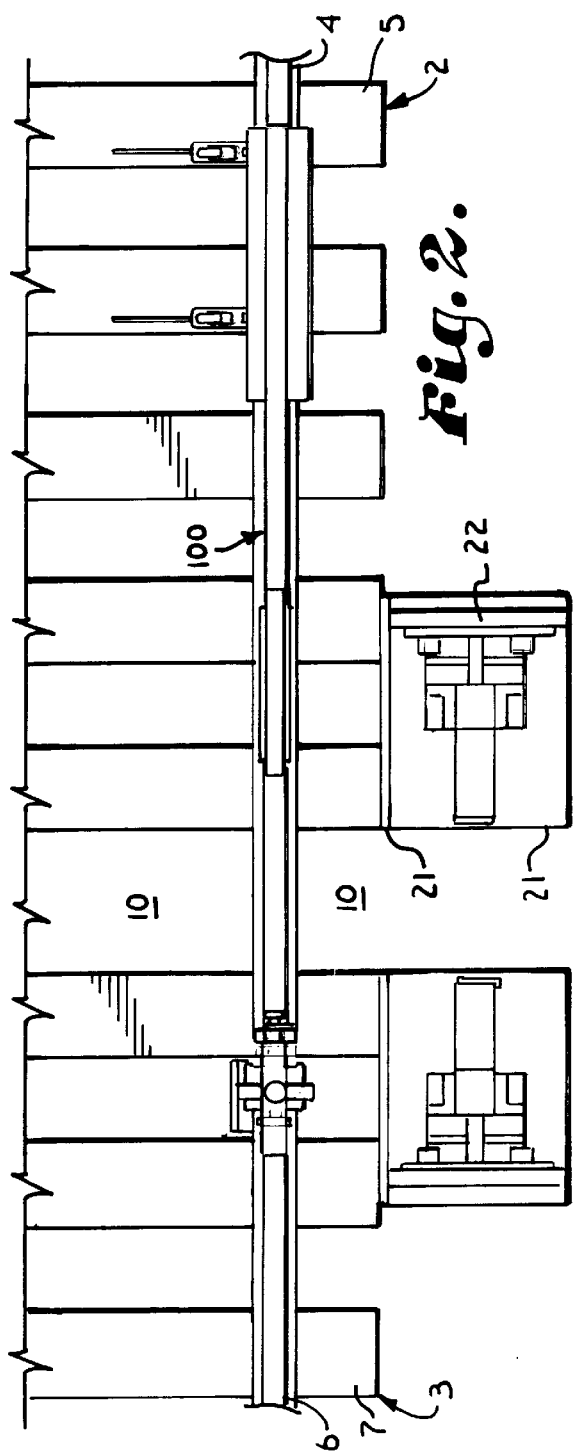

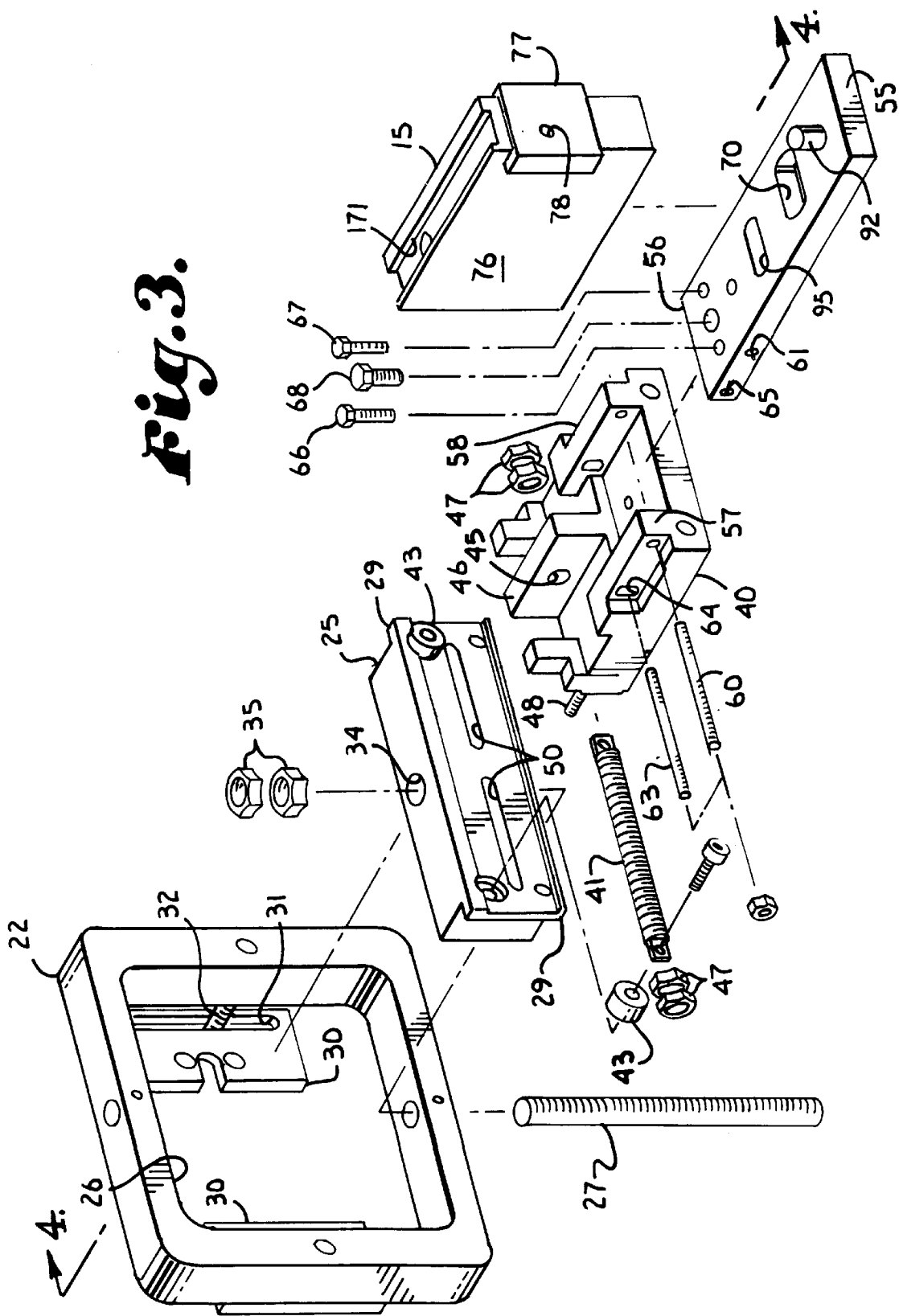

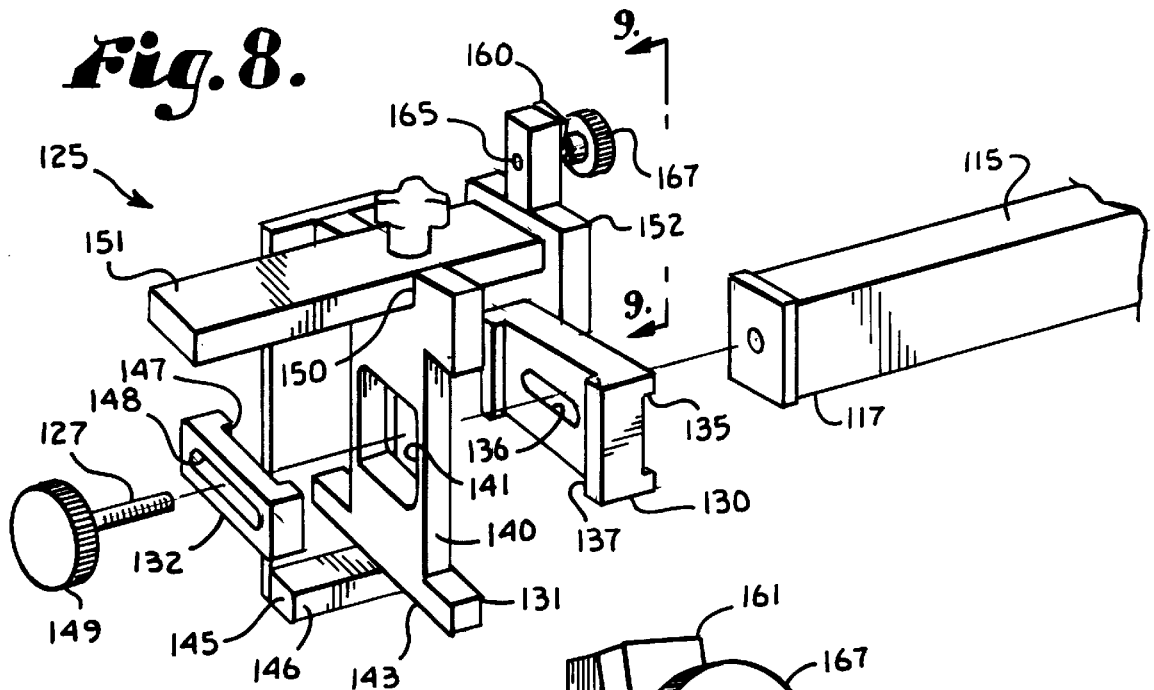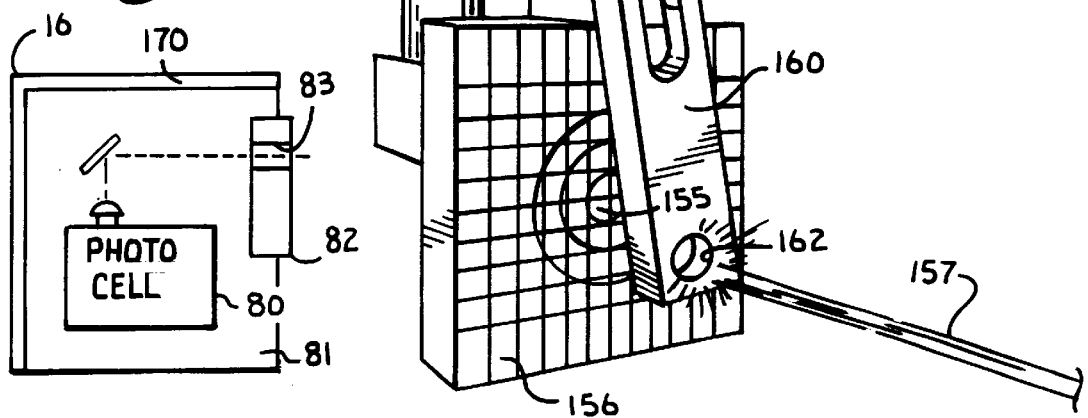

MISALIGNMENT DETECTION APPARATUS AND METHOD

BACKGROUND OF THE INVENTION

The present invention relates to an alignment verification system and in particular to a system for verifying that rails extending across a fixed span and movable span of a movable span railroad bridge are within an acceptable degree of misalignment.

Proper alignment of a moveable span with a fixed span of a moveable span railroad bridge, such as a swing span bridge or draw bridge, is important for railroad safety. Excessive misalignment of the rails on the moveable span with the rails on the fixed span as the train advances thereacross, could result in derailment of the train or excessive wear on the rails. Current federal railroad administration rules specify that trains should not be permitted to cross moveable span bridges if the rails on the moveable span are not aligned with the rails on the fixed span within ⅜ of an inch.

Mechanical systems have been developed for verifying that the moveable span has returned to a closed position in general alignment with the fixed span before permitting trains to pass thereacross. One such system is disclosed in U.S. Pat. No. 5,186,421. Such systems typically only detect misalignment in one plane, either vertically or horizontally. Further, existing systems do not permit relatively precise verification that the rails are within a fairly narrow range of misalignment. One limiting factor on the development of mechanical systems which might be capable of verifying whether the rails are within a narrow range of misalignment, is the severe pounding and vibration on the rails as a train passes thereacross. It is unlikely that a mechanical system mounted to the rails and adapted to measure or verify a relatively narrow range of misalignment could withstand the vibration or pounding generated by a train and remain effective.

There remains a need for a reliable system for verifying that the rails of a movable span of a moveable span bridge are within a relatively narrow range of misalignment with the rails of a fixed span thereof which can be used to control the travel of trains thereacross.

SUMMARY OF THE INVENTION

The present invention comprises a rail misalignment detection system for use in verifying whether first and second rails, one on a fixed span and one on a moveable span of a rail bridge, extend within an acceptable range of misalignment when the moveable span is positioned in a closed alignment with respect to the fixed span of the bridge. The detection system generally comprises an optical beam transmitter and a receiver, one mounted on the fixed span and the other mounted on the moveable span, such that the transmitter directs a beam of collimated light to a photocell in the receiver. The transmitter and receiver are mounted on the respective spans of the bridge such that their position relative to one another corresponds to the relative position or alignment of one set of the rails on the moveable span and fixed span of the bridge. The transmitter and receiver are further positioned relative to one another such that when the rails on the fixed and moveable spans extend within the acceptable range of misalignment the beam from the transmitter strikes the photocell to a sufficient degree to activate the photocell, and when the rails extend beyond the acceptable range of misalignment the beam does not strike the photocell to a sufficient degree to activate the photocell. The photocell communicates with a controller that can be programmed to send appropriate signals or otherwise control the advancement of trains across the bridge.

The degree and direction of misalignment which will result in deactivation of the photocell is controlled by varying the size and shape of apertures extending through first and second aperture plates mounted in front of the transmitter and receiver respectively. A horizontal rectangular slot formed in the aperture plate in front of the receiver may be used to verify vertical misalignment, while a vertical rectangular slot formed in the aperture plate in front of the receiver may be used to verify horizontal misalignment, and a circular aperture in the aperture plate in front of the receiver may be used to verify misalignment in any direction about a center axis.

The transmitter and receiver are secured to the respective spans on adjustable mounts which permit adjustment to the vertical and horizontal alignment of the transmitter and receiver relative to the spans to which they are attached and to each other. At the time of installation of the transmitter and receiver, the mounts are adjusted to place the transmitter and receiver at the same degree of existing misalignment as the rails using a special gauge.

The gauge generally comprises an elongate bar having a clamping base secured to a first end thereof for removably securing the elongate bar to one of the rails and preferably the rail on the span to which the transmitter is secured. The elongate bar is secured to that rail such that it extends in parallel alignment with the rail to which it is attached and a second end of the elongate bar extends adjacent to the rail on the other span.

A laser, such as incorporated in a laser level, is removably mounted to the elongate bar so as to direct a beam of light toward the second end of the elongate bar. A target holder is slidably mounted to the second end of the elongate bar for horizontal and vertical movement therewith. The target holder includes an inner surface engaging edge and an upper surface engaging edge. The relative position of the target holder on the second end of the elongate bar is adjusted until the inner surface engaging edge abuts against an inner surface of the rail adjacent thereto and the upper surface engaging edge abuts against an upper surface of the rail.

A target, having a target face with a bull's-eye thereon, is removably securable to the target holder. The gauge is sized and the bull's-eye is positioned on the target face such that the beam from the laser is aligned with the bull's-eye when the inner and upper surface engaging edges of the target holder are positioned in abutting relationship with the inner and upper surfaces respectively of the second rail and the first and second rails are in vertical and horizontal alignment.

If the first and second rails are not in vertical and horizontal alignment when the inner and upper surface engaging edges of the target holder are positioned in abutting relationship with the inner and upper surfaces respectively of the second rail, the beam will be displaced from the target a distance and direction corresponding to the distance and direction of misalignment of the first and second rails. A marker is provided and selectively positionable relative to the target face to indicate where the beam of light from the laser strikes the target face.

After the marker is positioned to record the degree and distance of misalignment of the rails, the target is removed from the target holder and placed on the receiver and the laser is removed from the elongate bar and placed on the transmitter. The relative positions of the transmitter and receiver are adjusted using the adjustable mounts, until the laser beam is aligned with the marker on the target face. The transmitter and receiver are then mounted in the same relative position or degree of misalignment as the first and second rails.

OBJECTS AND ADVANTAGES OF THE INVENTION

Therefore, the objects and advantages of the present invention include: to provide an apparatus for verifying relatively narrow ranges of tolerable misalignment between rails on movable and fixed spans of a railroad bridge; to provide such an apparatus which may be remotely mounted relative to the rails on the fixed and moveable spans; to provide such an apparatus which can provide a signal to indicate whether the rails are within an acceptable degree of misalignment; to provide such an apparatus which is relatively reliable; to provide such an apparatus which is relatively easy to maintain and to provide such an apparatus which is relatively inexpensive.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a side elevational view in simplified form of a fixed span and a moveable span of a rail bridge shown in a closed orientation and showing a transmitter mounted to the fixed span on an adjustable mount, a receiver mounted to the moveable span on an adjustable mount and a rail misalignment gauge mounted to a set of aligned rails on the fixed span and moveable span.

FIG. 2 is a top plan view of the rail bridge as shown in FIG. 1.

FIG. 3 is an enlarged and exploded perspective view of a portion of the adjustable mount for the transmitter as shown in FIG. 1 wherein the orientation of the adjustable mount in FIG. 3 is reversed relative to FIG. 1.

FIG. 5 is a schematic and fragmentary cross-sectional view of the receiver.

FIG. 8 is an enlarged, fragmentary and partially exploded perspective view showing details of the target holder and target of the rail misalignment gauge secured thereto.

FIG. 9 is an enlarged perspective view of the target showing a laser beam from a laser level of the rail misalignment gauge striking a face of the target.

DETAILED DESCRIPTION OF THE INVENTION

Figure 4:
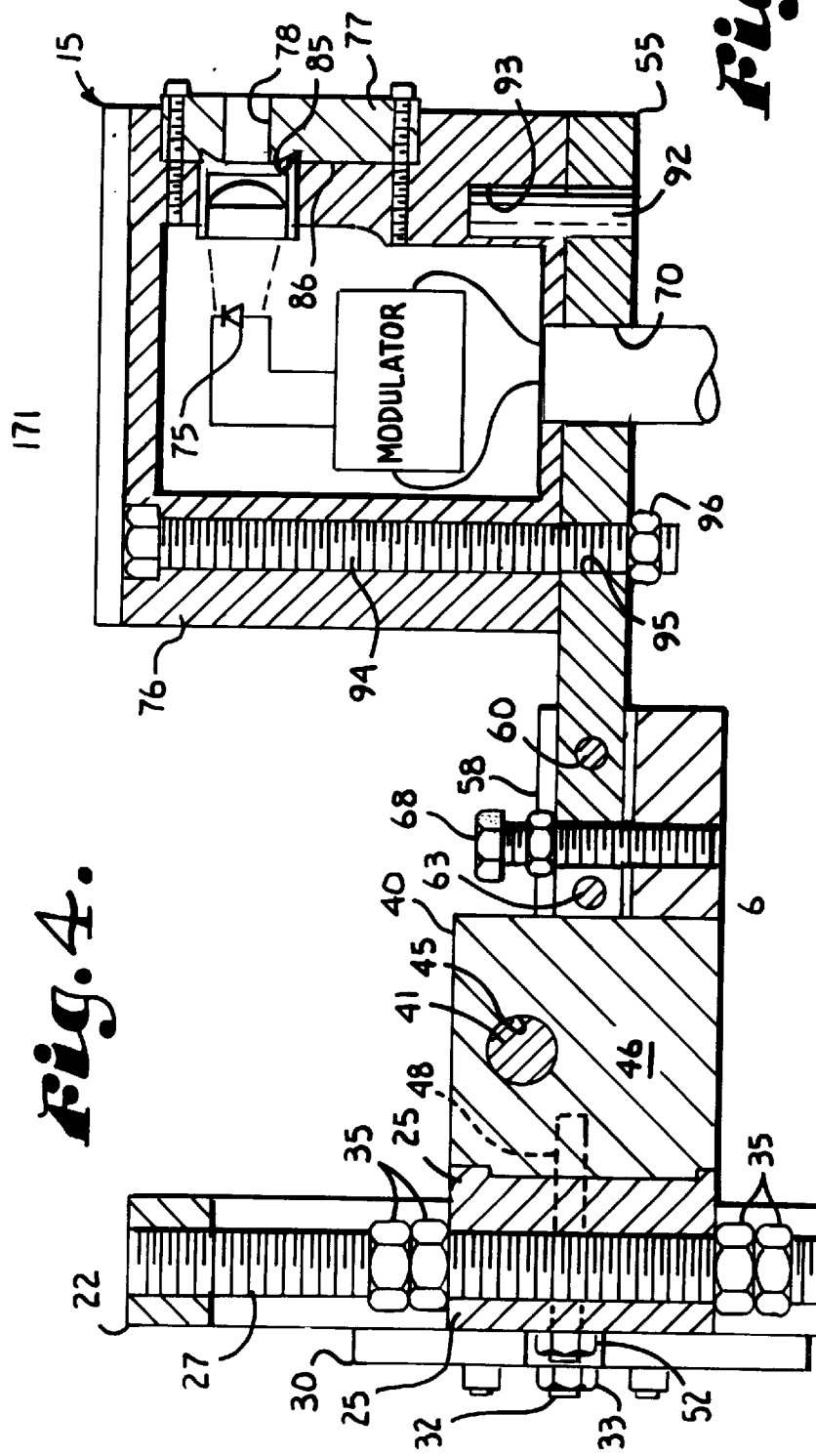
FIG. 4 is an enlarged, fragmentary, partially schematic, cross-sectional view taken generally along line 4—4 of FIG. 3 showing the transmitter secured to the associated adjustable mount.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, a simplified representation of a moveable span railroad bridge 1, of a swing span type, is shown in FIGS. 1 and 2 in a closed position. The moveable span railroad bridge 1 comprises a fixed span 2 and a moveable span 3. Rails 4 are mounted on deck 5 of the fixed span 2 and rails 6 are mounted on the deck 7 of the moveable span 3 respectively. The rails 4 mounted on the fixed span deck 5 may be referred to as first or fixed span rails 4, and the rails 6 mounted on the moveable span deck 7 may be referred to as second of moveable span rails 6.

A gap 10 extends between the fixed span 2 and the moveable span 3 to permit the moveable span 3 to swing away from the fixed span 2 when the bridge 1 is opened to permit barges and the like to pass therethrough. When the bridge 1 is returned to the closed position, such that the fixed span and moveable span rails 4 and 6 are generally aligned, slider keys (not shown) slide from a retracted position relative to the moveable span rail 6 across the gap 10 and along the fixed span rail 4 on an outer side thereof to span the gap 10 and provide a continuous surface for the train wheels to travel across.

A transmitter 15 and a receiver 16 are shown mounted to the fixed span 2 and moveable span 3 respectively by first and second adjustable mounting assemblies or mounts 17 and 18. It is to be understood that the spans to which the transmitter 15 and receiver 16 are attached may be reversed. It is to be understood that the transmitter and receiver 15 and 16 and the mounts 17 and 18 as well other components of the rail misalignment detection system as discussed below, are not drawn to scale and only with sufficient detail to show their relative positions and general configuration.

First mount 17 is shown in greater detail in FIGS. 3 and 4. The orientation of first mount 17 in FIGS. 3 and 4 has been reversed relative to FIG. 1. Second mount 18 is preferably of identical construction as first mount 17. First mount 17 includes angle bracket 21 (see FIGS. 1 and 2) and square perimeter frame 22. Angle bracket 21 is welded or bolted to the side of fixed span deck 5 proximate the gap 10. Perimeter frame 22 is bolted or welded to a vertical leg of angle bracket 21 so as to extend perpendicular to the side of fixed span 2.

First mount 17 includes a vertical adjustment slide 25 which is slidably mounted within a square opening 26 extending between opposed legs of perimeter frame 22 on vertical adjustment screw 27. Flanges 29 extend outward from vertical adjustment slide 25 across outer faces of the opposed legs of perimeter frame 22 to stabilize vertical adjustment slide 25 relative to perimeter frame 22. Vertical clamping plates 30 are bolted on opposite sides of the vertical adjustment slide 25 on the rear thereof and such that a portion of each vertical clamping plate 30 extends across a rear face of a respective leg of the perimeter frame 22. A vertically extending guide slot 31 is formed in each of the clamping plates 30. A bolt 32 extends through the guide slot 31 in each clamping plate 30 and into the respective leg of the perimeter frame 22. When a nut 33 on the end of bolt 32 is loosened, the clamping plate 30 is free to slide vertically relative to bolt 32. Nuts 33 are tightened against the respective clamping plate 31, to fix the vertical position of the clamping plate 30 and the vertical adjustment slide 25.

The vertical adjustment screw 27 extends through a bore 34 in the vertical adjustment slide 25 which is of a slightly larger diameter than the outer diameter of vertical adjustment screw 27 to permit the vertical adjustment slide 25 to slide freely on screw 27 when the clamping plates 30 are free to slide relative to bolts 32. Two pairs of nuts or jam nuts 35 threadingly secured on vertical adjustment screw 27 on opposite sides of vertical adjustment slide 25, may be advanced away from vertical adjustment slide 25 to permit slide 25 to be slid vertically. After the desired vertical alignment of slide 25 is established and the nuts 33 on bolts 32 are tightened against clamping plates 30, nuts 35 are tightened against vertical adjustment slide 25 to further fix its vertical alignment.

The adjustable mount 17 further includes a horizontal adjustment slide 40 which is slidably mounted in abutting relationship with vertical adjustment slide 25 on horizontal adjustment screw 41. Opposite ends of horizontal adjustment screw 41 are bolted onto a front face of vertical adjustment slide 25 on spacers 43 such that the horizontal adjustment screw 41 extends horizontally relative to vertical adjustment slide 25 and in spaced apart relation thereto. Horizontal adjustment screw 41 extends through a bore 45 in wall 46 of the horizontal adjustment slide 40. Wall 46 generally extends centrally and vertically relative to horizontal adjustment slide 40. The bore 45 in horizontal adjustment slide 40 is of slightly greater diameter than horizontal adjustment screw 41 such that the horizontal adjustment slide 40 generally slides freely relative to screw 41. Two pairs of nuts or jam nuts 47 threadingly secured on horizontal adjustment screw 41 on opposite sides of horizontal adjustment slide 40, may be advanced away from horizontal adjustment slide 40 to permit slide 40 to be slid horizontally. After the desired horizontal alignment of slide 40 is established, nuts 47 are tightened against horizontal adjustment slide 40 to fix its horizontal alignment.

Horizontal adjustment slide 40 is further secured to vertical adjustment slide 25 by horizontal guide bolts 48 (one of which is shown partially in FIG. 3) extending through horizontal guide slots 50 in vertical adjustment slide 25 and into horizontal adjustment slide 40. Nuts 52 (one of which is shown in FIG. 4) on the rear ends of bolts 48 may be tightened down against a rear face of vertical adjustment slide 25 to assist in fixing the horizontal alignment of horizontal adjustment slide 40.

A cantilever plate 55 is secured at a first end 56 to horizontal adjustment slide 40. In particular, first end 56 of cantilever plate 55 is positioned between sidewalls 57 and 58 of horizontal adjustment slide 40 and on top of a portion of horizontal adjustment slide 40 extending between sidewalls 57 and 58. A pivot pin 60 extends through a pivot bore 61 in the cantilever plate 55 proximate the first end thereof and is secured on opposite ends to sidewalls 57 and 58. A guide pin 63 similarly extends through ovate guide slots 64 formed in the side walls 57 and 58 and through a second bore 65 in the cantilever plate 55 closer to the first end 56 relative to pivot bore 61. The guide pin 63 is secured on opposite ends to sidewalls 57 and 58. The cantilever plate 55 pivots vertically about pivot pin 60. First and second set screws 66 and 67 extend generally vertically downward through cantilever plate 55 and engage an upwardly facing surface of the horizontal adjustment slide 40 and a third screw 68 extends vertically downward through cantilever plate 55 and into horizontal adjustment slide 40. The screws 66, 67 and 68 are adjustable to adjust the pivot position of the cantilever plate 55 relative to horizontal adjustment slide 40.

The cantilever plate 55 is sized for mounting of the transmitter 15 or receiver 16 thereto. A transmitter 15 is shown secured to the cantilever plate 55 in FIGS. 3 and 4. A cable hole 70 is formed in the cantilever plate 55 such that electrical cables may be run therethrough and connected to the transmitter 15 or receiver 16.

Referring to FIG. 4, the transmitter 15 includes a light emitting diode or light source 75 secured within a transmitter housing 76 behind a transmitter aperture plate 77. The light source 75 is positioned generally centrally behind an aperture 78 in the transmitter aperture plate 77. Referring to FIG. 5 (which generally comprises a schematic view of the receiver 16), the receiver 16 includes a photo cell 80 secured within a receiver housing 81 behind a receiver aperture plate 82 having a receiver aperature 83 extending therethrough. A mirror 84, positioned in line with and at a 45 degree angle relative to the aperature 83, reflects the light passing through the receiver aperature 83 to the photocell 80. It is to be understood that a transmitters or receivers of a wide range of designs could be utilized in conjunction with the rail misalignment detection system of the present invention.

The light source 75 is preferably of the type which produces a beam of modulated light. The photo cell 80 is selected to detect light of the wavelength emitted by the light source 75 and at the same modulation as emitted by the light source 75 such that ambient light does not produce false readings. The photo cell 80 generally comprises a switch which is activated or changes its condition when it is struck by modulated light of the detectable wavelength and of sufficient intensity.

The transmitter aperture plate 77 is designed to produce a beam of light which is relatively collimated with a minimal degree of divergence, to permit or facilitate relative accurate sensing by the photo cell 80. The phrase, collimated beam, generally refers to any beam of radiation whose rays are nearly parallel so that the beam does not converge or diverge appreciably. For the purpose of this application, a beam of collimated light shall refer to a beam of light which is sufficiently collimated to permit relatively accurate detection by a photo cell.

In this application the term light generally refers to any wavelength of electromagnetic radiation which may be collimated and which may be detected by a photo cell or its equivalent. Due to cost considerations, the light source 75 of the preferred embodiment, comprises a light emitting diode that produces a beam of visible light of a red wavelength. Transmitters and receivers utilizing visible light and infrared light are readily available. It is foreseeable that transmitters and receivers emitting and detecting electromagnetic radiation of other wavelengths might be utilized in conjunction with this invention if such systems are or become available.

A convex surface 85 is milled into an inner surface 86 of the transmitter aperture plate 77 around the aperture 78 extending therethrough to facilitate the collimation of light emitted from light source 75 through deflection of diverging rays of said light away from said aperture 78. The aperture 78 is relatively elongated and the aperture plate 77 is anodized black to reduce internal reflection of the light passing through aperture 78 to facilitate collimation.

The aperture 78 of transmitter aperture plate 77 and aperture 83 of receiver aperture plate 82 are sized and shaped to verify whether the transmitter 15 and receiver 16 are within an acceptable degree of displacement relative to one another. Aperture 78 may be circular to verify the degree of displacement in any direction relative to true axial alignment of the light source 75 relative to photo cell 80. An aperture 78, generally shaped as a vertically extending slot with parallel edges is used to verify horizontal displacement, while a horizontally extending slot with parallel edges is used to verify vertical displacement. An aperture 78 which is rectangular may be used to verify both vertical and horizontal displacement but within differing acceptable limits.

A cartridge heater (not shown) is secured within a bore in transmitter aperture plate 77 proximate the aperture 78 for use in heating the aperture plate 77 to minimize condensation within the aperture 78 and to facilitate the evaporation of moisture which might collect within the aperture 78 such as during a rain storm. Water collecting within the aperture 78 may adversely effect the accuracy of the system by changing the characteristics of the beam of light emitted from the light source 75. Similarly, a cartridge heater (not shown) is secured within a bore in receiver aperture plate 82 proximate the aperture 83 for use in heating the aperture plate 82 to minimize condensation within the aperture 83 and to facilitate the evaporation of moisture which might collect within the aperture 83. It is foreseen that other heat sources, other than cartridge heaters, could be utilized to keep moisture out of the apertures 78 and 83, or that other means for doing so might be incorporated therein.

Referring to FIG. 4, the transmitter housing 76 is pivotally mounted to a pivot pin or dowel 92 extending upward from the cantilever plate 55 and into a bore 93 of the housing 76. A position locking bolt 94 extends from the housing 76 through an elongate slot 95 in the cantilever plate 55 to permit pivoting of the rear of the housing 76 relative to the pivot pin 92. Nut 96 on bolt 94 may be tightened down against the cantilever plate 55 to fix the position of the housing 76 relative thereto.

The transmitter 15 and receiver 16 are mounted relative to an aligned set of the fixed span and moveable span rails 4 and 6 for verifying whether the fixed span rail 4 extends within an acceptable range of misalignment with the moveable span rail 6. Because the transmitter 15 and 16 are mounted remotely from the rails 4 and 6, it is necessary to make sure that the alignment of the transmitter 15 and receiver 16 corresponds to the alignment of the rails 4 and 6. Further, it is to be understood that the fixed span and moveable span rails 4 and 6 rarely will be in perfect alignment to begin with. Therefore, to ensure that the transmitter 15 and receiver 16 accurately verify whether the fixed span and moveable span rails 4 and 6 are within the acceptable range of misalignment, the transmitter 15 and receiver 16 are aligned to correspond to the same degree of misalignment as the fixed span and moveable span rails 4 and 6 using gauge 100 shown secured to the rails 4 and 6 in FIGS. 1 and 2.

Before using gauge 100 to set the alignment of the transmitter 15 and receiver 16, the mounts 17 and 18 are adjusted to level the transmitter 15 and receiver 16 and place them in general alignment.

Figure 6:
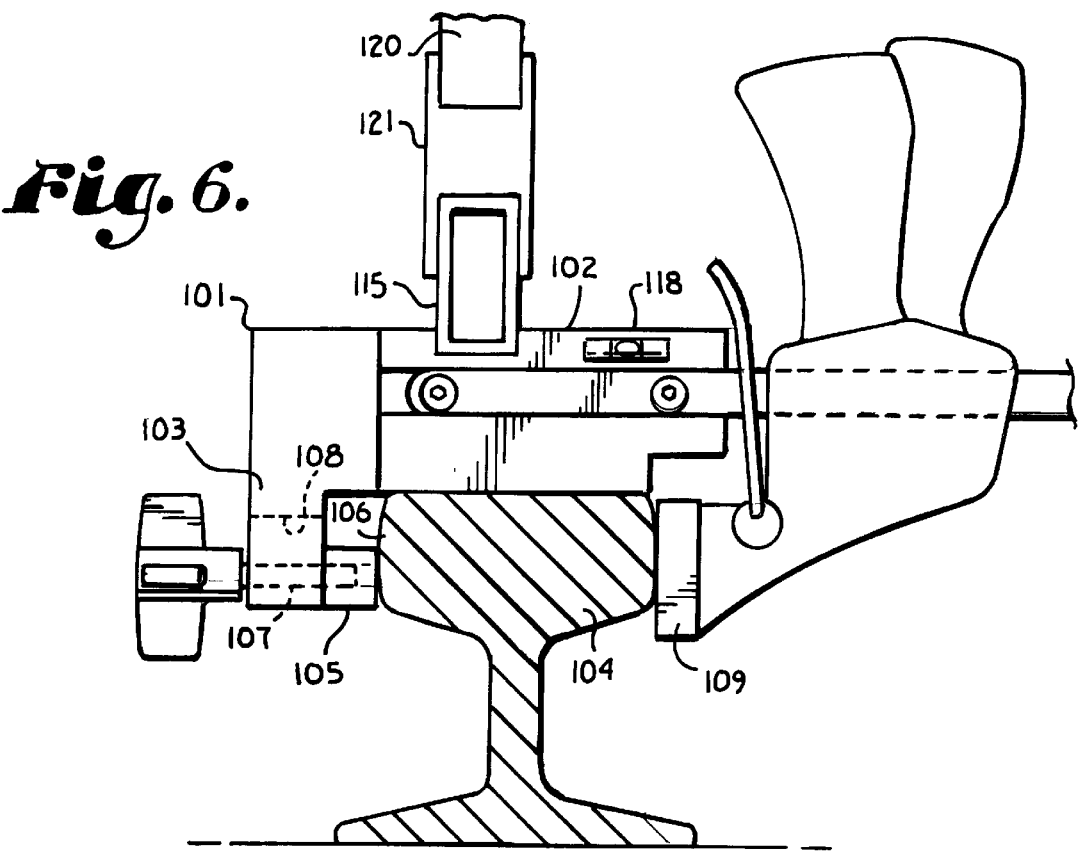
FIG. 6 is an enlarged and fragmentary cross-sectional view taken generally along line 6—6 of FIG. 1 showing a clamping base of the rail misalignment gauge secured to a rail on the fixed span of the bridge.

The gauge 100 includes a clamping base 101 adapted to be secured to one of either the fixed span or moveable span rails 4 or 6. The clamping base 101 is preferably secured to the rail 4 or 6 on the span 3 or 5 on which the transmitter 15 is mounted, which in the embodiment disclosed herein is fixed span rail 4. Referring to FIG. 6, the clamping base 101 includes a horizontal leg 102 and a vertical leg 103. The horizontal leg 102 is adapted to rest on top of the head or ball 104 of the rail to which it is attached. The vertical leg 103 extends downward from the horizontal leg 102 along the inner side of the rail. A pair of abutment posts or fixed jaws 105 (one of which is shown in FIG. 6) are secured to and extend inward from the vertical leg 103 in spaced relation from horizontal leg 102 and generally adjacent an inner surface 106 of the head or ball 104 of rail 4. The inner surface 106 is the surface against which the train wheel flange abuts as a train advances over the rail. Abutment posts 105 are mounted on bolts 107 extending through vertically oriented slots 108 in vertical leg 103 to permit vertical adjustment of abutment posts 105 relative to vertical leg 103 to permit the abutment posts 105 to be positioned against a portion of the inner surface 106 of rail head 104 which is generally flat. The abutment posts are generally spaced below the horizontal leg 102 to accommodate or extend around any protrusions or lips formed on the rail ball inner surface 106 through wear thereon.

Movable jaws 109 are slidably mounted relative to horizontal leg 102 therebelow and on a side opposite vertical leg 103. Movable jaws 109 are advanceable into engagement with the rail 4 on a side opposite fixed jaws 105 for drawing the fixed jaws 105 into engagement with the inner surface 106 of ball 104 of rail 4.

An elongate bar 115 is mounted at a first end 116 to the clamping base 101, on an upper surface thereof, such that the elongate bar 115 extends in parallel alignment over the rail 4, across the gap 10, between the fixed span 2 and moveable span 3, and over an end portion of the moveable span rail 6, such that a second end 117 of elongate bar 115 extends over rail 6. The clamping base 101 is secured to the rail 4 such that elongate bar 115 extends parallel to a vertical plane extending along the inner surface 106 of rail head 104 and parallel to a horizontal plane extending along an upper surface of the rail head 104. A level vial 118 is mounted in the end of the clamping base 101 to verify that the elongate bar 115 generally oriented in true vertical and horizontal alignment.

A laser, incorporated in a laser level 120 is mounted above the elongate bar 115 on laser mounting bracket 121. The laser level 120 is positioned between sidewalls of the laser mounting bracket 121 so as to direct a laser beam toward the second end 117 of the elongate bar 115. The mounting bracket 121 maintains the laser level 120 in parallel alignment with a longitudinal axis of the elongate bar 115.

As best seen in FIG. 8, a target holder 125 is slidably mounted to the second end 117 of elongate bar 115 on a bolt 127 extending axially out of the second end 117 of elongate bar 115. The target holder 125 includes horizontal slide plate 130, vertical slide plate 131 and clamp bracket 132. A horizontally extending channel 135 is formed on an inner surface of the horizontal slide plate 130 and is adapted to receive the second end 117 of elongate bar 115. A horizontal slot 136 extends through the horizontal slide plate 130 centrally relative to channel 135 such that the bolt 127 on the end of elongate bar 115 extends through horizontal slot 136 when the horizontal slide plate 130 is mounted on the second end 117 of elongate bar 115 to permit horizontal sliding of the horizontal slide plate 130 relative thereto.

A vertically extending channel 137 is formed on an outer surface of the horizontal slide plate 130 and is adapted to receive a portion of a central portion 140 of the vertical slide plate 131 to permit the vertical slide plate 131 to slide vertically relative thereto. A square hole 141 is formed in and extends through the central portion 140 of vertical slide plate 131. The vertical slide plate 131 is positioned within the vertically extending channel 137 of the horizontal slide plate 130 such that the bolt 127 extends through the square hole 141 to permit the vertical slide plate 131 to move vertically or horizontally relative to the second end 117 of the elongate bar 115.

Figure 7:
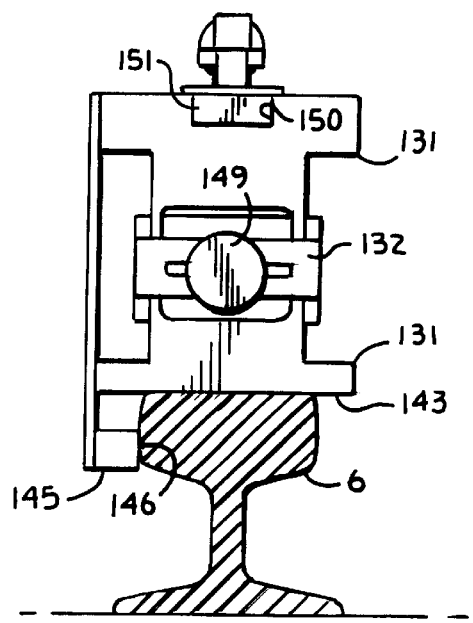
FIG. 7 is an enlarged and fragmentary cross-sectional view taken generally along line 7—7 of FIG. 1 showing a target holder and target of the rail misalignment gauge secured to a rail on the moveable span of the bridge.

A lower end of the vertical slide plate 131 includes a rail upper surface engaging edge 143 adapted to be positioned against or supported on an upper surface of the ball of rail 6 as best seen in FIG. 7. A rail side engaging member 145, having a rail inner surface engaging edge 146, is secured to one side of the vertical slide plate 131 such that the rail side engaging member 145 extends in spaced apart relation below a portion of the rail upper surface engaging edge 143 thereof. The position of the vertical slide plate 131 is slidably adjustable horizontally relative to the second end 117 of elongate bar 115 to advance the rail inner surface engaging edge 146 into abutting relationship with the inner surface of the ball of rail 6. The rail side engaging member 145 is spaced below the rail upper surface engaging edge 143 to extend around any protrusions or lips formed on an upper portion of the inner surface of the ball of rail 6 due to wear. The rail side engaging member 145 is mounted on bolts (not shown) secured within slots (not shown) on the vertical slide plate 131 to permit vertical adjustment of the rail side engaging member 145 relative to the vertical slide plate 131.

The clamp bracket 132 has a vertically extending channel 147 formed therein adapted to slidingly receive a portion of the central portion 140 of vertical slide plate 131. A horizontal slot 148 extends through the clamp bracket 132 such that the bolt 127 extends therethrough when the clamp bracket 132 is positioned against the vertical slide plate 131. A grippable knob 149 is secured to the distal end of bolt 127 and can be tightened against the clamp bracket 132 to press the clamp bracket 132, the vertical slide plate 131 and the horizontal slide plate 130 against the second end 117 of elongate bar 115 to fix their relative position.

The elongate bar 115 is removably securable to the clamping base 101, such that the direction away from the base 101 which the bar 115 extends may be reversed to permit the side of the ball 104 to which the jaws 105 and 109 abut to be reversed. Similarly the vertical slide plate 131 may be reversed to reverse the side of the ball 104 against which the side engaging member 145 abuts.

As best seen in FIG. 8, a notch 150 is formed in an upper portion of the vertical slide plate 131. The notch 150 is adapted to receive a target mounting arm 151 which extends rearwardly from target 152. The target mounting arm 151 is removably secured to the vertical slide plate 131 of the target holder 125 by a threaded bolt extending through aligned threaded bores in the target mounting arm 151 and the vertical slide plate 131. Referring to FIG. 9 which is a perspective view of target 152, a bulls-eye 155 is formed on a face 156 of the target 152. When secured to the target holder 125, the target mounting arm 151 supports the target 152 in front of the target holder 125 and generally in alignment with a laser beam 157 emitted from laser level 120.

The components of the gauge 100 are sized such that if the inner surfaces and upper surfaces of the balls of the fixed span rail 4 and moveable span rail 6 are perfectly aligned the laser beam from laser level 120 will be aligned with and strike the bulls-eye 155 on the face 156 of the target 152 when the rail upper surface engaging edge 143 of target holder 125 is positioned against an upper surface of the ball of rail 6 and the rail inner surface engaging edge 146 is positioned against an inner surface of the ball of rail 6. If the rails 4 and 6 are misaligned, the laser beam will be displaced from the bulls-eye 155 an equivalent distance both horizontally and vertically.

Referring to FIG. 9, a marker 160 is secured to the target 152 and selectively positionable relative to the target face 156 to indicate where the laser beam 157 from laser 120 strikes the target face 156. The marker 160 comprises a rectangular metal strap 161 having a circular bore 162 extending through one end thereof and an elongate slot 163 extending through an opposite end thereof. The strap 161 is pivotally secured relative to the face 156 of the target 152 by a bolt 165 extending through the elongate slot 163 and into a mounting block 166 on top of the target 152. A knob 167 on bolt 165 can be tightened against the strap 161 to fix its orientation relative to the target face 156. The circular bore 162 in strap 161 is sized to generally correspond with the diameter of the laser beam emitted by laser level 120 to provide a visual indication of where the beam 157 strikes the target face 156. It is foreseen that other means could be utilized for a marker, such as a round sticker, sized to correspond to the diameter of beam 157, removably secureable to the target face 156.

When the rails 4 and 6 are misaligned and the gauge 100 is positioned thereon as discussed above, the laser beam will be offset from the bulls-eye 155 an equivalent distance as the degree of misalignment both horizontally and vertically. The knob 167 may be loosened relative to strap 161 and the strap 161 is maneuvered until the circular bore 162 therein is aligned with the laser beam 157. The knob 167 is then tightened to fix the position of the strap 161 and thereby record the degree of misalignment of the rails 4 and 6.

Figure 10:
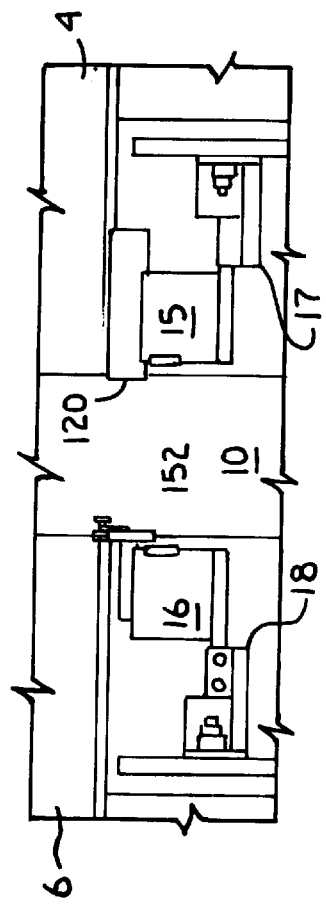
FIG. 10 is a fragmentary side elevational view similar to FIG. 1 showing the laser level supported on the transmitter and the target supported on the receiver.

Once the degree of misalignment is recorded on the target 152, the target 152 is removed from the target holder 125 and positioned on the receiver 16, as generally shown in FIG. 10. In particular, the target mounting arm 151 is positioned in a similarly sized arm receiving channel 170 (see FIG. 5) formed in the receiver 16 in an upper surface of the housing 81 thereof such that the target 152 generally extends in front of the receiver 16 and the target face 156 faces the transmitter 15. The laser level 120 is removed from the gauge 100 and positioned on the transmitter 15. In particular, the laser level 120 is positioned in a similarly sized laser level receiving channel 171 (see FIGS. 3 and 4) formed in the transmitter 15 in an upper surface of the housing 76 thereof such that the laser level 120 directs a laser beam toward the target face 156. The relative horizontal and vertical positions of the transmitter 15 and receiver 16 are then adjusted using the first and second adjustable mounts 17 and 18 respectively until the laser beam emitted from laser level 120 is aligned with the circular bore 162 on the strap 161 of marker 160. The transmitter 15 and receiver 16 are thereby positioned in the same degree or amount of misalignment as the rails 4 and 6.

For example, if the inner surfaces of the balls of rails 4 and 6 are already misaligned by one eighth of an inch horizontally at the time the transmitter 15 and receiver 16 are installed, the misalignment method noted above is used to misalign the transmitter 15 and receiver 16 by one eighth of an inch. Assuming the transmitter 15 and receiver 16 are designed to verify misalignment within three eighths of an inch, any further misalignment of the transmitter 15 and receiver 16 in the same direction horizontally in excess of two eighths or one quarter of an inch will deactivate the photo cell 80 because the beam of collimated light emitted from the transmitter 15 will no longer strike the photo cell to a sufficient degree. The photo cell 80 is electrically connected to the signal system for the bridge 1, such that deactivation of the photo cell 80 changes the output from the system from indicating that the bridge 1 is safe to cross to indicating that the bridge is not safe to cross.

Once the transmitter 15 and receiver are misaligned to the same degree as the rails 4 and 6, the laser level 120 and target 152 are removed therefrom and covers (not shown) with openings therein for the beam of colimated light are preferrably placed over the transmitter 15 and receiver 16 to protect the transmitter 15 and receiver 16 from the elements.

An electronics package for the rail misalignment detection system, might incorporate a delayed output turn off to prevent immediate turn off of the optical output circuit in case an object, such as an insect or bird, passes in front of the path of the optical beam from the transmitter 16. The electronics package might also include an external relay contact closure to lengthen the delay time when a train passes over the bridge when misalignment of the bridge is at maximum allowable limits to prevent the output from the electronics from turning on and off intermittently due to vibration from the train passing across the bridge. The electronics package also ceases to give output if the bridge mechanical locking sensing circuits, part of the bridge electronics system, are not in their normal condition. When an opening of the bridge is required, a time delay circuit activates with the unlocking process, and at the end of this delay, the optical output circuits are checked to see that the circuits are indeed off. If any of the optical circuits are in the "on" condition the output control circuits of the electronics package is latched off, preventing output drive from activating upon bridge closing. This function is primarily to detect a defective optical unit which is permanently in the "latched on" condition. The circuit is also self-restoring in that if the bridge is again unlocked and then re-locked and the fault is not detected at this time, the circuit will resume normal operation. All of these functions are repeated in another parallel circuit and their outputs compared to see if they agree before the output control circuit is activated.

In the preferred embodiment discussed above, it was noted that mounts 17 and 18 are essentially the same and permit adjustment of the relative position of the transmitter 15 and receiver 16 positioned thereon. It is foreseen that for cost considerations it may be preferable that only one of the mounts is adapted for vertical and horizontal adjustment of the transmitter or receiver (also referred to as optical units) mounted thereon and the other generally does not readily permit adjustment of the relative position of the optical unit positioned thereon.

It is foreseen that one rail misalignment detection system, generally comprising a transmitter and its mount and a receiver and its mount, will be mounted at each end of a swing span type bridge for each set of tracks. If the bridge includes two sets of tracks a total of four rail misalignment detection systems would be mounted on the bridge.

It is also foreseen that the misalignment detection system could be used in moveable span bridges other than rail bridges. The misalignment detection system would be used to verify that certain fixed span members and moveable span members remain within a tolerable range of misalignment upon closing of the bridge.

It is also foreseen that a source of collimated light other than a laser level 120 may be used for the gauge 100.

It is to be understood that while certain forms of the present invention have been illustrated and described herein, it is not to be limited to the specific forms or arrangement of parts described and shown.

What is claimed is:

1. A rail misalignment detection system for use in verifying whether a first rail on a moveable span of a rail bridge extends within an acceptable range of misalignment with a second rail on a fixed span of the rail bridge; said detection system comprising:
   a) a transmitter mounted on a first of said moveable span and said fixed span of said rail bridge and positioned to direct a beam of collimated light toward said second of said moveable span and said fixed span;
   b) a receiver mounted on a second of said moveable span and said fixed span of said rail bridge and including a photo cell; said receiver and said transmitter mounted relative to said first and second rails and to each other such that when said first and second rails extend within the acceptable range of misalignment said beam strikes said photo cell to a sufficient degree to activate said photocell, and when said first and second rails extend beyond the acceptable range of misalignment said beam does not strike said photocell to a sufficient degree to activate said photocell; and
   c) said photocell communicating with a signal system for said bridge such that deactivation of said photocell changes an output from said signal system from indicating that said bridge is safe to cross to indicating that said bridge is not safe to cross.

2. The rail misalignment detection system as in claim 1 wherein:
   (a) said beam of collimated light is of an infrared wavelength.

3. The rail misalignment detection system as in claim 1 wherein:
   (a) said beam of collimated light is of a visible light wavelength.

4. The rail misalignment detection system as in claim 1 wherein:
   (a) said transmitter is mounted on a first mount which is mounted to said first of said fixed span and said moveable span such that the horizontal and vertical alignment of said transmitter is adjustable;
   (b) said receiver is mounted on a second mount which is mounted to said second of said fixed span and said moveable span such that the horizontal and vertical alignment of said receiver is adjustable.

5. A rail misalignment detection system for use in verifying whether a first rail on a moveable span of a rail bridge extends within an acceptable range of misalignment with a second rail on a fixed span of the rail bridge; said detection system comprising:
   a) a transmitter mounted on a first of said moveable span and said fixed span of said rail bridge and positioned to direct a beam of collimated light toward said second of said moveable span and said fixed span;
   b) a receiver mounted on a second of said moveable span and said fixed span of said rail bridge and including a photo cell; said receiver and said transmitter mounted relative to said first and second rails and to each other such that when said first and second rails extend within the acceptable range of misalignment said beam strikes said photo cell to a sufficient degree to activate said photocell, and when said first and second rails extend beyond the acceptable range of misalignment said beam does not strike said photocell to a sufficient degree to activate said photocell;

c) said receiver includes a receiver aperture plate mounted in front of said photocell and having a receiver aperture extending therethrough; said receiver aperture sized, shaped and positioned such that said beam of collimated light will not strike said photocell to a sufficient degree to activate said photocell unless said first and second rails are within the acceptable range of misalignment.

6. The rail misalignment detection system as in claim 5 wherein:

c) said transmitter includes a transmitter aperture plate mounted in front of a source of a non-collimated beam of light; said transmitter aperture plate having a transmitter aperture extending therethrough adapted to reduce divergence of said non-collimated beam of light passing therethrough to produce said beam of collimated light.

7. A gauge for detecting and recording the degree of misalignment between a moveable span rail on a moveable span of a rail bridge with a fixed span rail on a fixed span of the rail bridge comprising:

(a) an elongate bar;

(b) a clamping base secured to said elongate bar at a first end thereof for removably securing said elongate bar to a first of said fixed span and moveable span rails such that said elongate bar extends in parallel alignment with said rail to which it is attached and a second end of said elongate bar extends adjacent to the second of said rails;

(c) a first source of collimated light removably mounted to said elongate bar so as to direct a first beam of collimated light toward a second end of said elongate bar;

(d) a target holder having an inner surface engaging edge and an upper surface engaging edge and slidably mounted to said second end of said elongate bar to permit said target holder to slide vertically and horizontally relative to said elongate bar such that said inner surface engaging edge is slidingly advanceable into abutment with an inner surface of the second of said rails and said upper surface engaging edge is slidingly advanceable into abutment with an upper surface of the second of said rails;

(e) a target removably securable to said target holder and having a target face with a bulls-eye thereon; said bulls-eye positioned on said target face such that said first beam of collimated light is aligned with said bulls-eye when said inner and upper surface engaging edges of said target holder are positioned in abutting relationship with the inner and upper surfaces respectively of the second of said rails and the inner surfaces and upper surfaces of the first and second rails are aligned;

(f) a marker selectively positionable relative to said target face to indicate where said first beam of collimated light strikes said target face.

8. The gauge as disclosed in claim 7 wherein:

(a) said marker comprises a strap having a circular bore formed at one end thereof of a diameter corresponding to the diameter of the first beam of collimated light striking the target face, said strap secured to said target such that said circular bore is selectively positionable in alignment with said first beam of collimated light.

9. The gauge as disclosed in claim 7 in combination with a rail misalignment detection system for use in verifying whether a moveable span rail on a moveable span of a rail bridge extends within an acceptable range of misalignment with a fixed span rail on a fixed span of the rail bridge; said detection system comprising:

(a) a transmitter mounted on a first mount on a first of said moveable span and said fixed span of said rail bridge and directing a second beam of collimated light toward said second of said moveable span and said fixed span;

(b) a receiver including a photo cell; said receiver mounted on a second mount on a second of said moveable span and said fixed span of said rail bridge such that said photocell faces said transmitter; at least one of said first and second mounts being adjustable such that the vertical and horizontal alignment of said transmitter or said receiver mounted thereon is adjustable; said receiver and said transmitter mounted relative to said first and second rails and to each other such that when said first and second rails extend within the acceptable range of misalignment said second beam of collimated light strikes said photocell to a sufficient degree to activate said photocell, and when said first and second rails extend beyond the acceptable range of misalignment said second beam of collimated light does not strike said photocell to a sufficient degree to activate said photocell, (c) said first source of collimated light is removably securable to said transmitter and said target is removably securable to said receiver such that adjustment of the relative alignment of said transmitter and said receiver to align said first beam of collimated light with said marker on said target face advances said transmitter to the same degree of misalignment with said receiver as the first rail to the second rail.

10. The gauge as disclosed in claim 7 in combination with a rail misalignment detection system for use in verifying whether a moveable span rail on a moveable span of a rail bridge extends within an acceptable range of misalignment with a fixed span rail on a fixed span of the rail bridge; said detection system comprising:

(a) a transmitter mounted on a first adjustable mount on a first of said moveable span and said fixed span of said rail bridge such that the vertical and horizontal alignment of said transmitter is adjustable; said transmitter directing a second beam of collimated light toward said second of said moveable span and said fixed span;

(b) a receiver including a photocell; sad receiver mounted on a second adjustable mount on a second of said moveable span and said fixed span of said rail bridge such that the vertical and horizontal alignment of said receiver is adjustable; said receiver and said transmitter mounted relative to said first and second rails and to each other such that when said first and second rails extend within the acceptable range of misalignment said second beam of collimated light strikes said photocell to a sufficient degree to activate said photocell, and when said first and second rails extend beyond the acceptable range of misalignment said second beam of collimated light does not strike said photocell to a sufficient degree to activate said photocell, (c) said first source of collimated light is removably securable to said transmitter and said target is removably securable to said receiver such that adjustment of the relative alignment of said transmitter and said receiver to align said first beam of collimated light with said marker on said target face advances said transmitter to the same degree of misalignment with said receiver as the first rail to the second rail.

11. A method for verifying whether a first rail on a moveable span of a rail bridge extends within an acceptable range of misalignment with a second rail on a fixed span of the rail bridge; said method comprising the steps of:

a) attaching a transmitter to a first of said fixed span and said moveable span remotely relative to said first or second rail thereon such that said transmitter emits a first beam of collimated light toward a second of said fixed span and said moveable span;

b) attaching a receiver to said second of said fixed span and said moveable span remotely relative to said first or second rail thereon; said receiver having a photo cell positioned within a housing behind an aperture extending through said housing; said aperture sized and shaped such that said beam of collimated light will strike said photo cell to a sufficient degree to activate said photo cell unless said beam of collimated light is misaligned relative to said photocell by an amount exceeding the acceptable range of misalignment between said first and second rails to be detected;

c) measuring the degree of misalignment between the first rail and the second rail; and d) misaligning the transmitter from the receiver to correspond to the measured degree of misalignment between the first and second rail.

12. The method as in claim 11 wherein:

a) said measuring step includes connecting an elongate bar to said first rail such that a second end of said elongate bar extends adjacent said second rail and positioning a laser on said elongate bar to direct a beam of light toward a target positioned on a target holder connected to said second end of said elongate bar; said target holder including rail engaging surfaces and being movable relative to said second end of said elongate bar to advance said rail engaging surfaces against a side and a top of said second rail; said method further including marking a spot on said target where said beam of light strikes said target; and b) said misaligning step includes removing said laser from said elongate bar and placing it on said transmitter and removing said target from said target holder and aligning said transmitter relative to said receiver such that said beam of light emitted from said laser is aligned with said spot marked on said target.

13. A misalignment detection system for use in verifying whether a moveable span member on a moveable span of a bridge extends within an acceptable range of misalignment with a fixed span member on a fixed span of the bridge; said detection system comprising:

a) a transmitter comprising a first source of collimated light and mounted on a first of said moveable span and said fixed span of said bridge and positioned to direct a first beam of collimated light toward said second of said moveable span and said fixed span;

b) a receiver mounted on a second of said moveable span and said fixed span of said bridge and including a photo cell; said receiver and said transmitter mounted relative to said first and second members and to each other such that when said first span and moveable span members extend within the acceptable range of misalignment said first beam strikes said photo cell to a sufficient degree to activate said photocell, and when said fixed span and moveable members extend beyond the acceptable range of misalignment said first beam does not strike said photocell to a sufficient degree to activate said photocell; and c) said photocell communicating with a signal system for said bridge such that deactivation of said photocell changes an output from said signal system from indicating that said bridge is safe to cross to indicating that said bridge is not safe to cross.

14. The misalignment detection system as in claim 13 in combination with a gauge for detecting the degree of misalignment between the fixed span and moveable span members of said bridge; said gauge comprising:

(a) an elongate bar;

(b) a clamping base secured to said elongate bar at a first end thereof for removably securing said elongate bar to a first of said fixed span and moveable span members such that said elongate bar extends in parallel alignment with said member to which it is attached and a second end of said elongate bar extends adjacent to the second of said members;

(c) a second source of collimated light removably mounted to said elongate bar so as to direct a second beam of collimated light toward a second end of said elongate bar;

(d) a target holder having a target removably securable thereto; said target having a bulls-eye on a face thereof; said target holder slidably mounted to said second end of said elongate bar to permit said target holder to slide vertically and horizontally relative to said elongate bar and adapted to engage said second member such that said bulls-eye of said target mounted on the target holder is displaced relative to said second beam of collimated light an equivalent distance, both vertically and horizontally, as the second member is displaced relative to the first member; and (e) a marker selectively positionable relative to said target face to indicate where said second beam of collimated light strikes said target face.

15. A misalignment detection system for use in verifying whether a moveable span member on a moveable span of a bridge extends within an acceptable range of misalignment with a fixed span member on a fixed span of the bridge; said detection system comprising:

a) a transmitter comprising a first source of collimated light and mounted on a first of said moveable span and said fixed span of said bridge and positioned to direct a first beam of collimated light toward said second of said moveable span and said fixed span;

b) a receiver mounted on a second of said moveable span and said fixed span of said bridge and including a photo cell; said receiver and said transmitter mounted relative to said first and second members and to each other such that when said first span and moveable span members extend within the acceptable range of misalignment said first beam strikes said photo cell to a sufficient degree to activate said photocell, and when said fixed span and moveable members extend beyond the acceptable range of misalignment said first beam does not strike said photocell to a sufficient degree to activate said photocell;

c) said receiver includes a receiver aperture plate mounted in front of said photocell and having a receiver aperture extending therethrough; said receiver aperture sized, shaped and positioned such that said first beam of collimated light will not strike said photocell to a sufficient degree to activate said photocell unless said fixed span and moveable span members are within the acceptable range of misalignment.

16. The misalignment detection system as in claim 15 wherein:

a) said transmitter includes a transmitter aperture plate mounted in front of a source of a non-collimated beam of light; said transmitter aperture plate having a transmitter aperture extending therethrough adapted to reduce divergence of said non-collimated beam of light passing therethrough to produce said first beam of collimated light.

* * * * *